United States Patent
Huang et al.

(10) Patent No.: US 7,543,889 B2
(45) Date of Patent: Jun. 9, 2009

(54) GEAR-DRIVEN ADJUSTING ASSEMBLY FOR CONTINUOUS ADJUSTMENT OF SEAT ANGLE

(75) Inventors: Xing Huang, Xiangfan (CN); Qing Cui, Xiangfan (CN); Zhengkun Huang, Xiangfan (CN)

(73) Assignee: Hubei Aviation Precision Machinery Technology Co., Ltd., Xiangfan (CN)

( * ) Notice: Subject to any disclaimer, the term of this patent is extended or adjusted under 35 U.S.C. 154(b) by 280 days.

(21) Appl. No.: 11/629,849

(22) PCT Filed: Sep. 14, 2006

(86) PCT No.: PCT/CN2006/002398

§ 371 (c)(1),
(2), (4) Date: Dec. 15, 2006

(87) PCT Pub. No.: WO2007/131394

PCT Pub. Date: Nov. 22, 2007

(65) Prior Publication Data
US 2008/0272639 A1    Nov. 6, 2008

(30) Foreign Application Priority Data
May 11, 2006 (CN) .......................... 2006 1 0019053

(51) Int. Cl.
*B60N 2/20* (2006.01)
*B60N 2/225* (2006.01)
*B60N 2/235* (2006.01)
(52) U.S. Cl. ..................................... 297/362
(58) Field of Classification Search ................... 297/362
See application file for complete search history.

(56) References Cited

U.S. PATENT DOCUMENTS 4,371,207 A * 2/1983 Wilking et al. .......... 297/362 X (Continued)

FOREIGN PATENT DOCUMENTS

| CN | 2353244 Y | 12/1999 |
|---|---|---|
| JP | 2001-070073 | 3/2001 |

*Primary Examiner*—Rodney B White
(74) *Attorney, Agent, or Firm*—Merchant & Gould P.C.

(57) ABSTRACT

A gear-driven adjusting assembly for continuous adjustment of seat angle is disclosed. A external gear plate of the gear transmission mechanism is mounted in a internal gear plate with a eccentricity therebetween. An external cam of a gap removing mechanism is mounted between a central boss of the internal gear plate and the inner hole of the external gear plate. An internal cam is mounted between the inner hole of the external cam and the central boss of the internal gear plate, and a spring is mounted between the two cams, which form an eccentric cam mechanism. A central shaft of a driving mechanism is provided in the hole of the central boss of the internal gear plate, a driving block of the driving mechanism is provided between the internal cam and external cam. When the spring is in a free state, the internal cam and the external cam are wedged tightly to remove the seat gap; the driving block of the driving mechanism can overcome the elastic force by a moment to release the wedge effect of the gap removing mechanism, such that the gear transmission mechanism is driven for transmission and rotation, so as to achieve the purpose of adjusting seat angle. The assembly according to the present invention has the features of compact configuration, small gap, high strength as well as high universalness, and can conveniently implement the function of manual adjustment, electrical adjustment and continuous adjustment of the seat back angle.

7 Claims, 2 Drawing Sheets

U.S. PATENT DOCUMENTS

| | | | |
|---|---|---|---|
| 5,096,261 A * | 3/1992 | Baloche | 297/362 |
| 5,154,475 A * | 10/1992 | Kafitz | 297/362 |
| 5,277,672 A * | 1/1994 | Droulon et al. | 297/362 X |
| 5,308,294 A * | 5/1994 | Wittig et al. | 297/362 X |
| 5,871,414 A | 2/1999 | Voss et al. | |
| 6,076,889 A * | 6/2000 | Su et al. | 297/362 |
| 6,543,851 B2 | 4/2003 | Schillak | |
| 6,579,203 B2 * | 6/2003 | Wang et al. | 297/362 X |
| 6,692,397 B2 * | 2/2004 | Wang et al. | 297/362 X |
| 6,755,470 B2 | 6/2004 | Iwata et al. | |

* cited by examiner

GEAR-DRIVEN ADJUSTING ASSEMBLY FOR CONTINUOUS ADJUSTMENT OF SEAT ANGLE

TECHNICAL FIELD

The present invention relates to a gear-driven adjusting assembly for continuous adjustment of seat angle, which can be used to continuously adjust seat back angle of vehicle seat or other seat by coupling to any kind of mounting plate of seat back and seat cushion.

BACKGROUND OF THE INVENTION

In the prior art, seat angle adjusting mechanism can be generally divided into two kinds: plate spring adjusting mechanism on the principle of detent and ratchet; and gear-driven adjusting mechanism on the principle of planetary gear transmission. The seat angle adjusting mechanisms disclosed in the Chinese utility model publications No. CN2,358,759, CN2,494,632, CN257,768 and CN2,590,784 are plate spring adjusting mechanisms on the principle of detent and ratchet. Continuous adjustment as well as electrical adjustment cannot be implemented in these four core transmission means because of the limitation rooted in their structures.

Gear-driven adjusting assemblies for continuous adjustment of seat angle in the prior art includes: adjusting mechanisms of double inner-meshed gear transmission and adjusting mechanisms of single inner-meshed gear transmission.

The seat angle adjusting mechanisms disclosed in the Chinese utility model publications No. CN2,193,087 and CN2,696,412 are gear-driven adjusting mechanisms adopting double inner-meshed gear transmission. Since there are inevitable manufacture errors, said mechanisms cannot remove gap in the double inner-meshed gears simultaneously, the seat back gap is therefore relatively large.

SUMMARY OF THE INVENTION

The present invention provides a gear-driven adjusting assembly for continuous adjustment of seat angle which can implement manual and electrical adjustment and provide smaller set back gap with low cost.

The present invention provides the following technical solution. A gear-driven adjusting assembly for continuous adjustment of seat angle, including a gear transmission mechanism, a gap removing mechanism, a spring, and driving mechanism. An external gear plate of the gear transmission mechanism is mounted in an internal gear plate with a eccentricity therebetween, the internal teeth of the internal gear plate being in mesh with the external teeth of the external plate. An external cam of a gap removing mechanism is mounted between the central boss of the internal gear plate and an inner hole of the external gear plate. An internal cam is mounted between the inner hole of the external cam and the central boss of the internal gear plate. A spring is mounted in the external cam with its two ends abut against the internal cam and the external cam respectively, which form a eccentric cam mechanism. An central shaft of the driving mechanism is mounted in the hole of the central boss of the internal gear plate, the driving block of the driving mechanism is provided between the internal cam and external cam.

The present invention is further characterized in that said internal cam of the gap removing mechanism has n inclined wedge surfaces, and the external cam of the gap removing mechanism has n corresponding inclined wedge surfaces which can wedge with said inclined wedge surfaces, where n≧2. The internal cam and external cam make use of the interaction among the n inclined wedge surfaces to remove gap.

The spring is made of elastic material such as polyurethane, spring steel wire, elastic leaf, so as to form delicate structure and therefore reduce its volume.

The present invention is characterized in that the driving mechanism is inlaid with a circle of plastic ring which has the function of sealing and noise removing.

The present invention adopts a single inner-meshed gear transmission adjusting assembly for continuous adjustment of seat angle, which includes the gear transmission mechanism, the gap removing mechanism, the spring, and the driving mechanism. The gear transmission mechanism utilizes internal gear and external gear to implement single inner-meshed planetary gear transmission. The gap removing mechanism utilizes an internal cam and an external cam mounted in the center of the internal gear and external gear. The spring is provided between the two cams, and the internal cam and external cam are wedged tightly by the spring when the spring is in a free state to remove the seat gap. The driving block of the driving mechanism are provided between the internal cam and external cam, which can overcome the elastic force by a moment to release the wedge effect of the gap removing mechanism, and drive the gear transmission mechanism to operate, such that makes the internal gear and external gear rotate with each other to achieve the purpose of adjusting seat angle. While the driving mechanism implements the transmission, it also has sealing function so that the assembly may have better dustproof effect and longer life-span. The present invention can be easily adapted to different kinds of vehicles by designing different coupling plate according to the user's requirement, which makes the present invention highly universal to different applications.

The present invention adopts a single inner-meshed gear transmission adjusting assembly, providing a seat angle adjustment mechanism that can continuously adjust seat angle either manually or electrically, so that can be used broadly in application. The gap reduce mechanism according to the present invention can achieve smaller seat back gap, requires small operating moment and has high strength. Furthermore, it has the advantages of simple process, lower cost and being more adaptive to be produced in China, therefore is more suitable for mass production.

BRIEF DESCRIPTION OF THE DRAWINGS

The present invention will be further described below in conjunction with the embodiment provided by the accompany drawings, wherein.

DETAILED DESCRIPTION OF THE PREFERRED EMBODIMENTS

Figure 1:
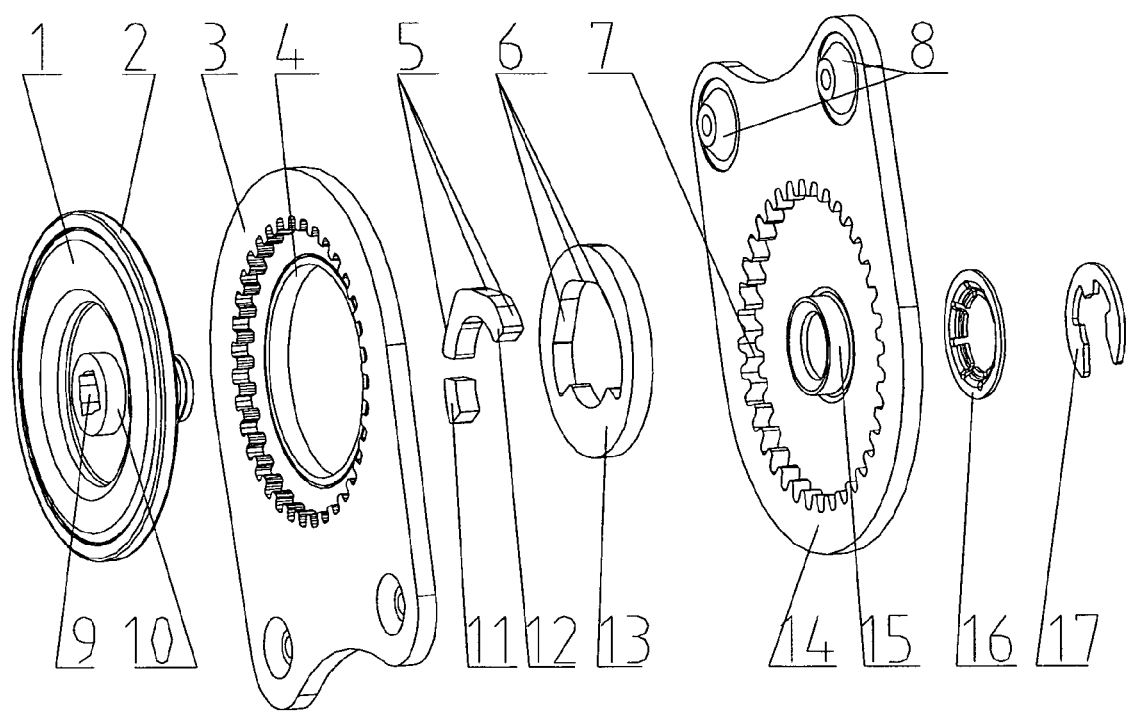
FIG. 1 is a diagrammatic illustration showing the assembling relationship of the present invention.
Figure 2:
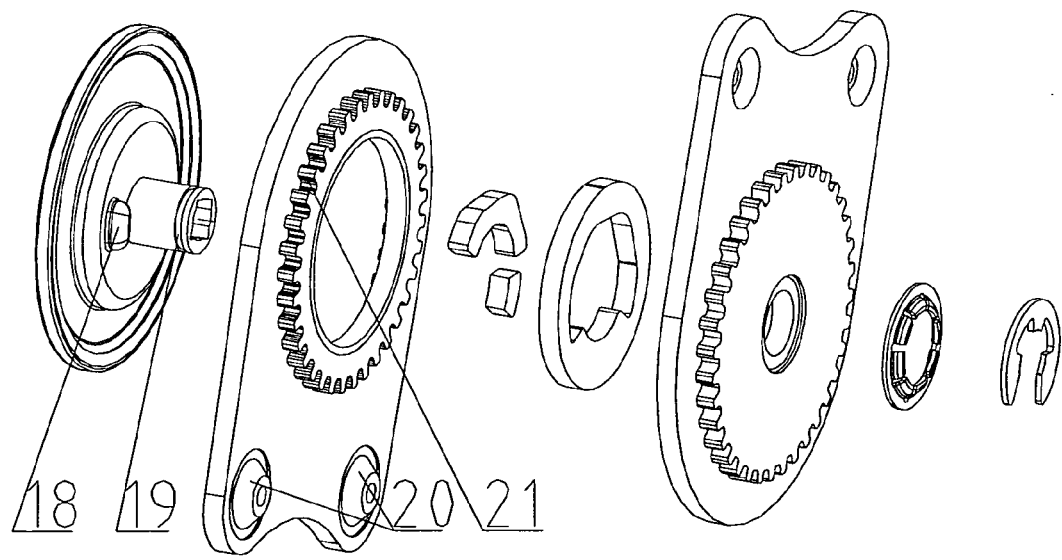
FIG. 2 is a diagrammatic illustration viewed from direction A of FIG. 1.

In FIGS. 1 and 2, the present invention includes a gear transmission mechanism, a gap removing mechanism, a spring, and a driving mechanism. The gear transmission mechanism adopts single inner-meshed planetary gear transmission with small teeth difference, and includes a internal gear plate 14 and a external gear plate 3, the external gear plate 3 is mounted in the internal gear plate 14 with a eccentricity therebetween so that the internal teeth 7 are in mesh with the external teeth 21 to implement the single inner-meshed planetary gear transmission of the internal gear and external gear. When an operating moment is applied to the driving mechanism, a planetary movement occurs due to the engagement between the internal teeth plate 14 and the external teeth plate 3, which therefore changes the angle between the two plates and the purpose of adjusting seat angle is achieved.

Since a certain gap may inevitably exist between the internal gear and external gear being engaged with each other for transmission, corresponding gap may be formed in the seat back, which causes the seat back to shake, and reduce the comfortability. Gap removing mechanism will remove the gap described above so that the comfortability of the seat can be improved remarkably. The external cam 13 of the gap removing mechanism according to the present invention is mounted between the central boss 15 of the internal gear plate 14 and the inner hole 4 of the external gear plate 3, the internal cam 12 is mounted between the inner hole of the external cam 13 and the central boss 15 of the internal gear plate 14. Under the elastic force of the spring 11, three outer inclined wedge surfaces 5 of the internal cam 12 interact with three inner inclined wedge surfaces of the external cam 13, generating a force for increasing the eccentricity between the internal gear plate 14 and the external gear plate 3, so as to remove the gap between the tooth 7 of the internal gear plate 14 and the tooth 21 of the external gear plate 3, and further remove the seat back gap. However, the number of the inner and outer inclined wedge surface in this embodiment is not limited to the above-mentioned three, but may be two, four, et al.

The external cam 13 slidably engages the inner hole 4 of the external gear plate 3. The external cam 13 and the internal cam 12 slidably engage the central boss 15 of the internal gear plate 14.

The spring 11 is provided between the internal cam 12 and external cam 13. In the initial condition, the spring 11 is in a compressed state, and the inclined surfaces 5, 6 of the internal cam 12 and the external cam 13 are tightly wedged with the internal gear plate 14 and the external gear plate 3 due to the force of the spring 11. The spring 11 may be made of elastic material such as polyurethane, spring steel wire, elastic leaf.

The central shaft 10 of the driving mechanism 1 is provided in the hole of the central boss 15 of the internal gear plate 14, the driving block 18 is provided between the internal cam 12 and the external cam 13, and a profile hole 9 is provided in the central shaft 10. A circular groove 19 is designed on the central shaft 10 of the driving mechanism 1. A retaining ring 17 is provided is provided in the circular groove 19. Said retaining ring 17 is blocked in the circular groove 19 to assemble the whole apparatus into one-piece. An elastic gasket 16 is provided between the retaining ring 17 and internal gear plate 14 to overcome the axial clearance caused by manufacture errors. A plastic ring 2 is inlaid on the driving mechanism 1 to seal the whole apparatus and remove noise in use. Two bosses 8 are provide on the internal gear plate 14, and two bosses 20 are provided on the external gear plate 3, so as to be welded to the mounting plate connected to the seat.

Figure 3:
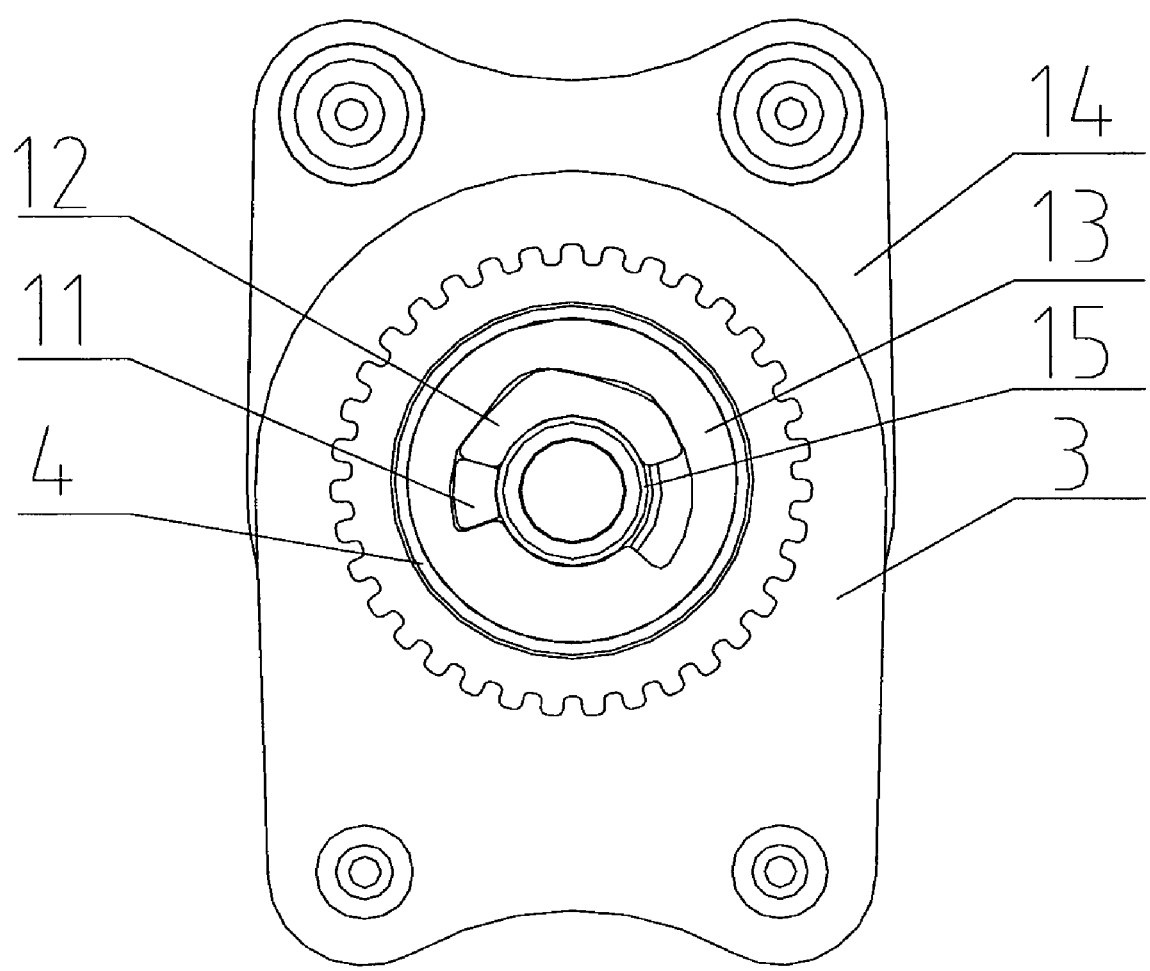
FIG. 3 is a diagrammatic illustration showing the inner structure of the assembled mechanism according to the present invention.

In FIG. 3, the external cam 13 is a eccentric cam. The external cam 13 is mounted between the central boss 15 of the internal gear plate 14 and the inner hole 4 of the external gear plate 3. The internal cam 12 is mounted between the inner hole of the external cam 13 and the central boss 15 of the internal gear plate 14. The spring 11 is mounted on the external cam 13 with its two ends abut against the internal cam 12 and the external cam 13. Under the elastic force of the spring 11, three outer inclined wedge surfaces of the internal cam 12 interact with three inner inclined wedge surfaces of the external cam 13, generating a force for increasing the eccentricity between the internal gear plate 14 and the external gear plate 3. When an operating moment is applied to the square hole in the central shaft of the driving mechanism, the driving mechanism rotates. When rotating counterclockwise, the driving mechanism will drive the internal cam 12 to remove the wedge effect and cause the planetary movement of the internal gear plate 14 and external gear plate 3 so as to achieve the purpose of adjusting seat angle. When rotating clockwise, the driving mechanism will drive the external cam 13 to release the wedge effect for angle adjustment.

What is claimed is:

1. A gear-driven adjusting assembly for continuous adjustment of seat angle including a gear transmission mechanism and a driving mechanism, wherein an external gear plate of the gear transmission mechanism is mounted in an internal gear plate with an eccentricity therebetween, internal teeth of the internal gear plate are in mesh with external teeth of the external gear plate; an external cam of a gap removing mechanism is mounted between a central boss of the internal gear plate and an inner hole of the external gear plate, an internal cam is mounted between an inner hole of the external cam and the central boss of the internal gear plate, a spring is provided in the external cam with its two ends abutting against the internal cam and the external cam, respectively, which form an eccentric cam mechanism; and a central shaft of a driving mechanism is provided in a hole of the central boss of the internal gear plate, a driving block of the driving mechanism is provided between the internal cam and external cam.

2. A gear-driven adjusting assembly for continuous adjustment of seat angle according to claims 1, wherein the gear transmission mechanism is a single inner-meshed planetary gear transmission mechanism in which the difference between the number of the external teeth and the number of the internal teeth is small.

3. A gear-driven adjusting assembly for continuous adjustment of seat angle according to claims 1, wherein the spring is made of polyurethane, spring steel wire or elastic leaf.

4. A gear-driven adjusting assembly for continuous adjustment of seat angle according to claims 1, wherein the internal cam of said gap removing mechanism has n inclined wedge surfaces, and the external cam of the gap removing mechanism has n corresponding inclined wedge surfaces which can wedge with said inclined wedge surfaces, where $n \geq 2$.

5. A gear-driven adjusting assembly for continuous adjustment of seat angle according to claims 1, wherein: the external cam slidably engages with the inner hole of the external gear plate, the external cam and the internal cam slidably engage with the central boss of the internal gear plate.

6. A gear-driven adjusting assembly for continuous adjustment of seat angle according to claims 1, wherein a circular groove is provided on the central shaft of the driving mechanism, a retaining ring is provided in the circular groove to assemble the whole gear-driven adjusting assembly into one-piece, and an elastic gasket is provided between the retaining ring and internal gear plate.

7. A gear-driven adjusting assembly for continuous adjustment of seat angle according to claims 1, wherein a plastic ring sealing the whole gear-driven adjusting assembly is inlaid on the driving mechanism.

* * * * *